(12) United States Patent
Lin et al.

(10) Patent No.: US 10,412,407 B2
(45) Date of Patent: Sep. 10, 2019

(54) METHOD AND APPARATUS OF INTER PREDICTION USING AVERAGE MOTION VECTOR FOR VIDEO CODING

(71) Applicant: MEDIATEK INC., Hsin-Chu (TW)

(72) Inventors: Jian-Liang Lin, Su'ao Township, Yilan County (TW); Yi-Wen Chen, Taichung (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/772,876

(22) PCT Filed: Oct. 28, 2016

(86) PCT No.: PCT/CN2016/103690
§ 371 (c)(1),
(2) Date: May 2, 2018

(87) PCT Pub. No.: WO2017/076221
PCT Pub. Date: May 11, 2017

(65) Prior Publication Data
US 2018/0324454 A1 Nov. 8, 2018

Related U.S. Application Data

(60) Provisional application No. 62/251,537, filed on Nov. 5, 2015.

(51) Int. Cl.
*H04N 19/52* (2014.01)
*H04N 19/91* (2014.01)
(Continued)

(52) U.S. Cl.
CPC ........... *H04N 19/52* (2014.11); *H04N 19/159* (2014.11); *H04N 19/176* (2014.11); *H04N 19/91* (2014.11); *H04N 19/124* (2014.11)

(58) Field of Classification Search
CPC .... H04N 19/52; H04N 19/159; H04N 19/176; H04N 19/91; H04N 19/194
See application file for complete search history.

(56) References Cited

U.S. PATENT DOCUMENTS

| 8,873,874 B2 | 10/2014 | Suzuki et al. |
| 2012/0134416 A1* | 5/2012 | Lin .................. H04N 19/52 375/240.16 |

(Continued)

FOREIGN PATENT DOCUMENTS

| CN | 103229504 A | 7/2013 |
| CN | 104704835 A | 6/2015 |

(Continued)

OTHER PUBLICATIONS

International Search Report dated Jan. 24, 2017, issued in application No. PCT/CN2016/103690.
(Continued)

*Primary Examiner* — Christopher Braniff
(74) *Attorney, Agent, or Firm* — McClure, Qualey & Rodack, LLP (57) ABSTRACT

A method and apparatus for video coding utilizing a motion vector predictor (MVP) for a motion vector (MV) for a block are disclosed. According to an embodiment, a mean candidate is derived from at least two candidates in the current candidate list. The mean candidate includes two MVs for the bi-prediction or one MV for the uni-prediction, and at least one MV of the mean candidate is derived as a mean of the MVs of said at least two candidates in one of list 0 and list 1. The mean candidate is added to the current candidate list to form a modified candidate list, and one selected candidate is determined as a MVP or MVPs from the modified candidate list, for current MV or MVs of the current block. The current block is then encoded or decoded in Inter, Merge, or Skip mode utilizing the MVP or MVPs selected.

20 Claims, 5 Drawing Sheets

(51) Int. Cl.
*H04N 19/176* (2014.01)
*H04N 19/159* (2014.01)
*H04N 19/124* (2014.01)

(56) References Cited

U.S. PATENT DOCUMENTS

| | | |
|---|---|---|
| 2012/0230408 A1 | 9/2012 | Zhou |
| 2012/0257678 A1 | 10/2012 | Zhou et al. |
| 2013/0107958 A1 | 5/2013 | Shimada et al. |
| 2015/0208087 A1 | 7/2015 | Park et al. |

FOREIGN PATENT DOCUMENTS

| | | |
|---|---|---|
| CN | 104813667 A | 7/2015 |
| JP | 2014220846 A | 11/2014 |
| WO | 2012/174990 A1 | 12/2012 |
| WO | 2013/056656 A1 | 4/2013 |

OTHER PUBLICATIONS

Lin, J.L., et al.; "CE13: Results of section 11 tests 1, 3d and 3e on replacing redundant MVPs and its combination with adaptive MVP list size;" Joint Collaborative Team on Video Coding (JCT-VC) of ITU-T SG16 WP3 and ISO/IEC JTC1/SC29/WG11; Nov. 2011; pp. 1-7.

\* cited by examiner

| Merge_idx | L0 | L1 |
|---|---|---|
| 0 | MVL0_a,RefL0_a | MVL1_a,RefL1_a |
| 1 | MVL0_b,RefL0_b | |
| 2 | MVL0_c,RefL0_c | MVL1_c,RefL1_c |
| 3 | | MVL1_d,RefL1_d |
| 4 | (MVL0_a+MVL0_b)>>1 | MVL1_a,RefL1_a |
| 5 | | |
| 6 | | |
| 7 | | |

| Merge_idx | L0 | L1 |
|---|---|---|
| 0 | MVL0_a,RefL0_a | MVL1_a,RefL1_a |
| 1 | MVL0_b,RefL0_b | |
| 2 | MVL0_c,RefL0_c | MVL1_c,RefL1_c |
| 3 | | MVL1_d,RefL1_d |
| 4 | (MVL0_a+MVL0_b)>>1 | MVL1_a,RefL1_a |
| 5 | (MVL0_a+MVL0_c)>>1 | (MVL1_a+MVL1_c)>>1 |
| 6 | | |
| 7 | | |

| Candidates |
|---|
| Ac |
| Bc |
| A1 |
| B1 |
| B0 |
| A0 |
| B2 |
| Affine candidate |
| Mean cadidate |
| T_H |
| T_C |
| T_G |
| T_F |
| T_H2 |
| T_C2 |
| T_G2 |
| T_F2 |
| Additional candidates |
| Zero candidates |

METHOD AND APPARATUS OF INTER PREDICTION USING AVERAGE MOTION VECTOR FOR VIDEO CODING

CROSS REFERENCE TO RELATED APPLICATIONS

The present invention claims priority to U.S. Provisional Patent Application, Ser. No. 62/251,537, filed on Nov. 5, 2015. The U.S. Provisional Patent Applications is hereby incorporated by reference in its entirety.

TECHNICAL FIELD

The present invention relates to Inter prediction for video coding. In particular, the present invention relates to techniques of Inter prediction using average motion vector in a video coding system.

BACKGROUND

Inter prediction is a technique to exploit the temporal redundancy in the video sequence. Furthermore, motion estimation/motion compensation is used to take into consideration of object movement between frames. The motion estimation process identifies one (uni-prediction) or two (bi-prediction) best reference blocks in one or two reference pictures. The best reference block is located according to a corresponding motion vector (MV). The coding system usually derives the difference (i.e., prediction residuals) between an underlying block and a corresponding reference block and encodes the residuals. When bi-prediction is used, the two reference blocks are combined, such as averaging, to form a predictor for the underlying block.

Inter prediction is often used with Intra prediction in various video coding systems, such as the High Efficiency Video Coding (HEVC) standard developed in recent years. In the High Efficiency Video Coding (HEVC) system, the fixed-size macroblock of H.264/AVC is replaced by flexible block structure. The basic unit for compression is termed coding tree unit (CTU). Each CTU may contain one coding unit (CU) or recursively split into four smaller CUs until the predefined minimum CU size is reached. Each CU (also named leaf CU) contains one or multiple prediction units (PUs) and a tree of transform units (TUs).

In general, a CTU consists of one luma coding tree block (CTB) and two corresponding chroma CTBs, a CU consists of one luma coding block (CB) and two corresponding chroma CBs, a PU consists of one luma prediction block (PB) and two corresponding chroma PBs, and a TU consists of one luma transform block (TB) and two corresponding chroma TBs. However, exceptions can occur because the minimum TB size is 4×4 for both luma and chroma (i.e., no 2×2 chroma TB supported for 4:2:0 colour format) and each Intra chroma CB always has only one Intra chroma PB regardless of the number of Intra luma PBs in the corresponding Intra luma CB.

For an Intra CU, the luma CB can be predicted by one or four luma PBs, and each of the two chroma CBs is always predicted by one chroma PB, where each luma PB has one Intra luma prediction mode and the two chroma PBs share one Intra chroma prediction mode. Moreover, for the Intra CU, the TB size cannot be larger than the PB size. In each PB, the Intra prediction is applied to predict samples of each TB inside the PB from neighbouring reconstructed samples of the TB. For each PB, in addition to 33 directional Intra prediction modes, DC and planar modes are also supported to predict flat regions and gradually varying regions, respectively.

For each Inter PU, one of three prediction modes including Inter, Skip, and Merge, can be selected. For each of the three Inter prediction modes, a motion vector competition (MVC) scheme is used to select a motion candidate from a given candidate set that includes spatial and temporal motion candidates. Multiple references for motion estimation allow using the best reference in two possible reconstructed reference picture lists (namely List 0 and List 1). The reference picture list may be simply referred as a list or a List in this disclosure. For the Inter mode (unofficially termed AMVP (Advanced Motion Vector Prediction) mode), Inter prediction indicators (List 0, List 1, or bi-directional prediction), reference indices, motion candidate indices, motion vector differences (MVDs) and prediction residuals are transmitted. As for the Skip mode and the Merge mode, only Merge indices are transmitted, and the current PU inherits the Inter prediction indicator, reference indices, and motion vectors from a neighbouring PU referred by the coded merge index. In the case of a Skip coded CU, the residual signal is also omitted. Quantization, entropy coding, and deblocking filter (DF) are also in the coding loop of HEVC.

Figure 1:
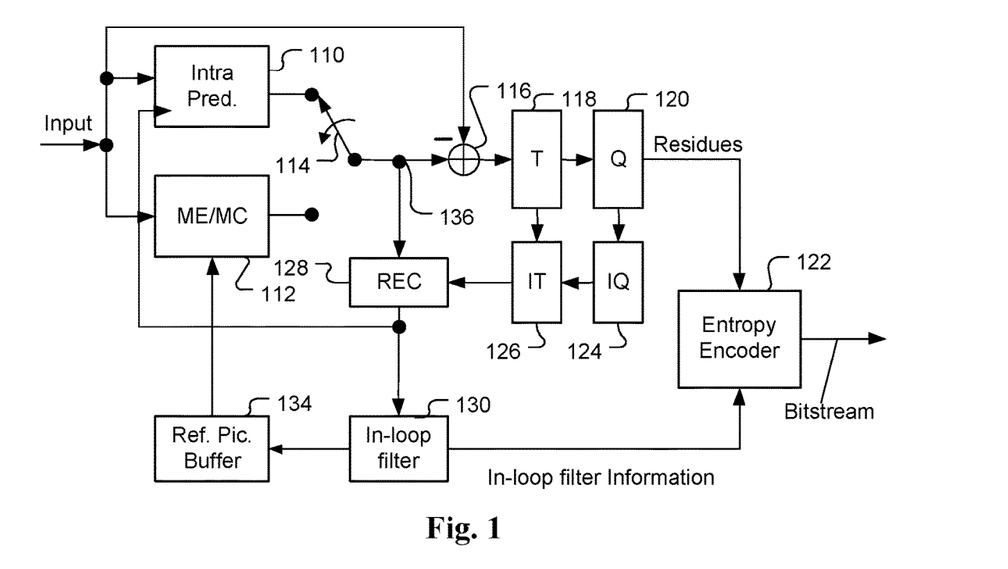
FIG. 1 illustrates an exemplary block diagram of a video encoder using adaptive Inter/Intra prediction.

FIG. 1 illustrates an exemplary adaptive Inter/Intra video coding system incorporating loop processing. For Inter-prediction, Motion Estimation (ME)/Motion Compensation (MC) 112 is used to provide prediction data based on video data from other picture or pictures. Switch 114 selects Intra Prediction 110 or Inter-prediction data and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion, coding modes, and other information associated with the image area. The side information may also be compressed by entropy coding to reduce required bandwidth. Accordingly, the data associated with the side information are provided to Entropy Encoder 122 as shown in FIG. 1. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1, incoming video data undergoes a series of processing in the encoding system. The reconstructed video data from REC 128 may be subject to various impairments due to a series of processing. Therefore, In-loop filter 130 is often applied to the reconstructed video data before the reconstructed video data are stored in the Reference Picture Buffer 134 in order to improve video quality. For example, deblocking filter (DF) and Sample Adaptive Offset (SAO) have been used in the High Efficiency Video Coding (HEVC) standard. The in-loop filter information may have to be incorporated in the bitstream so that a decoder can properly recover the required information. Therefore, in-loop filter information is provided to Entropy Encoder 122 for incorporation into the bitstream. In FIG. 1, in-loop filter 130 is applied to the reconstructed video before the reconstructed samples are stored in the reference picture buffer 134. The system in FIG. 1 is intended to illustrate an exemplary structure of a typical video encoder. It may correspond to the High Efficiency Video Coding (HEVC) system, VP8, VP9 or H.264.

Figure 2:
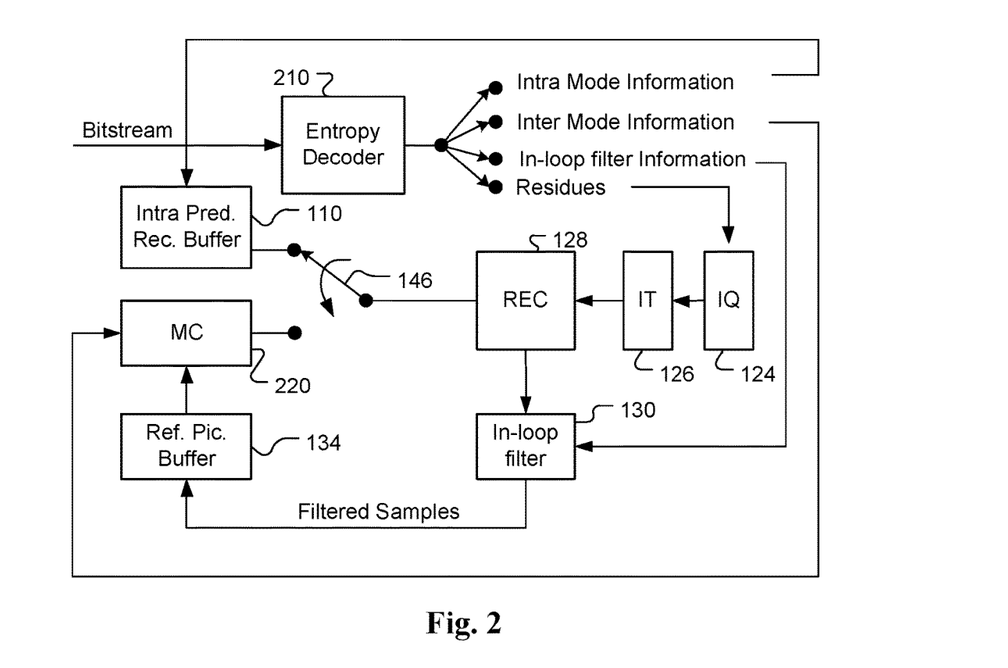
FIG. 2 illustrates an exemplary block diagram of a video decoder using adaptive Inter/Intra prediction.

FIG. 2 illustrates a system block diagram of a corresponding video decoder for the encoder system in FIG. 1. Since the encoder also contains a local decoder for reconstructing the video data, some decoder components are already used in the encoder except for the entropy decoder 210. Furthermore, only motion compensation 220 is required for the decoder side. The switch 146 selects Intra-prediction or Inter-prediction and the selected prediction data are supplied to reconstruction (REC) 128 to be combined with recovered residues. Besides performing entropy decoding on compressed residues, entropy decoding 210 is also responsible for entropy decoding of side information and provides the side information to respective blocks. For example, Intra mode information is provided to Intra-prediction 110, Inter mode information is provided to motion compensation 220, loop filter information is provided to loop filter 130 and residues are provided to inverse quantization 124. The residues are processed by IQ 124, IT 126 and subsequent reconstruction process to reconstruct the video data. Again, reconstructed video data from REC 128 undergo a series of processing including IQ 124 and IT 126 as shown in FIG. 2 and are subject to coding artefacts. The reconstructed video data are further processed by In-loop filter 130 before the reconstructed pictures are stored in the reference picture buffer 134.

As mentioned earlier, motion vector prediction is widely in recent advanced video coding as coding tool to reduce bits required for motion information coding. The motion vector prediction process includes generating a motion vector candidate list and pruning the candidate list to remove redundancy. A brief description of the generation process and pruning process are reviewed as follows.

Competitive Spatial-Temporal Motion Candidate in Inter Prediction

There are three prediction modes for the Inter prediction in HEVC, including the Inter mode, Skip mode and Merge mode. For all the three modes, a motion vector competition (MVC) scheme is applied to increase the coding efficiency of the MV prediction and MV coding. The MVC process generates a list of ordered candidates and selects one motion candidate among a given candidate list. The candidate list contains spatial and temporal motion candidates.

Figure 3:
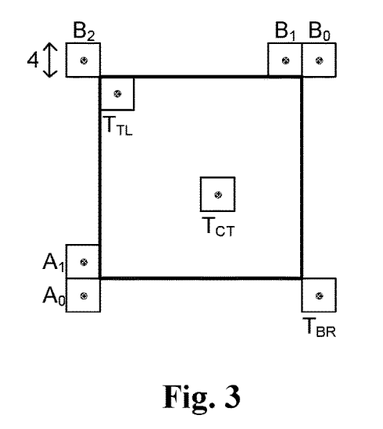
FIG. 3 illustrates an example of candidate list for the Inter mode according to HEVC.

For the Inter mode, an Inter prediction indicator is transmitted to denote list 0 prediction, list 1 prediction, or bi-prediction. Next, one or two reference indices are transmitted to indicate the reference picture(s) when there are multiple reference pictures in a given list. An index is transmitted for each prediction direction to select one motion candidate from the candidate list. FIG. 3 illustrates an example of candidate list for the Inter mode according to HEVC. The candidate list includes two spatial motion candidates and one temporal motion candidate:
1. Left candidate (the first available from $A_0$, $A_1$)
2. Top candidate (the first available from $B_0$, $B_1$, $B_2$)
3. Temporal candidate (the first available from $T_{BR}$ and $T_{CT}$)

The left spatial motion candidate is searched from the below left to the left (i.e., $A_0$ and $A_1$) and the first available one is selected as the left candidate. The top spatial motion candidate is searched from the above right to the above left (i.e., $B_0$, $B_1$, and $B_2$) and the first available one is selected as the top candidate. A temporal motion candidate is derived from a block ($T_{BR}$ or $T_{CT}$) located in a reference picture, which is termed temporal collocated picture. The temporal collocated picture is indicated by transmitting a flag in slice header to specify the reference picture list and a reference index in slice header to indicate the reference picture in the reference list used as the collocated reference picture. After the index is transmitted, one or two corresponding motion vector differences (MVDs) are transmitted, where the MVD corresponds to the difference between a MV being coded and its MV predictor.

For the Skip mode and Merge mode, a Merge index is signalled to indicate the selected candidate in the merging candidate list. No Inter prediction indicator, reference index, or MVD is transmitted. Each PU coded in the Skip or Merge mode reuses the Inter prediction indicator, reference index (or indices), and motion vector(s) of the selected candidate. It is noted that if the selected candidate is a temporal motion candidate, the reference index is always set to 0. As shown in FIG. 3, the merging candidate list for the Skip mode and the Merge mode includes four spatial motion candidates and one temporal motion candidate:
1. Left candidate ($A_1$)
2. Top candidate ($B_1$)
3. Above right candidate ($B_0$)
4. Below left candidate (A0)
5. Above left candidate (B2), used only when any of the above spatial candidate is not available
6. Temporal candidate (the first available from $T_{BR}$ and $T_{CT}$)

Redundancy Removal and Additional Motion Candidates

For the Inter mode, Skip mode, and Merge mode, after deriving the spatial motion candidates, a pruning process is performed to check the redundancy among the spatial candidates.

After removing redundant or unavailable candidates, the size of the candidate list could be adjusted dynamically at both the encoder and decoder sides so that the truncated unary binarization can be beneficial for entropy coding of the index. Although the dynamic size of candidate list could improve coding gains, it also introduces a potential parsing problem. Since the temporal motion candidate is included in the candidate list, a mismatch between the candidate list on the encoder side and that on the decoder side may occur when one MV of a previous picture cannot be decoded correctly. This will result in a parsing error of the candidate index. This parsing error may propagate and cause the rest of the current picture improperly parsed or decoded. This parsing error could even affect subsequent Inter pictures that also allow temporal motion candidates. Therefore, a small decoding error of a MV may cause failures of parsing many subsequent pictures.

In HEVC, in order to solve the mentioned parsing problem, a fixed candidate list size is used to decouple the candidate list construction and the parsing of the index. Moreover, in order to compensate the coding performance loss caused by the fixed list size, additional candidates are assigned to the empty positions in the candidate list. In this process, the index is coded in truncated unary codes of a maximum length, where the maximum length is transmitted in slice header for the Skip mode and Merge mode and fixed to 2 for the Inter mode.

For the Inter mode, a zero vector motion candidate is added to fill the empty positions in the AMVP candidate list after the deriving and pruning the candidate list containing the two spatial motion candidates and the one temporal motion candidate. As for the Skip mode and Merge mode, after deriving and pruning the candidate list containing the four spatial motion candidates and the one temporal motion candidate, additional candidates are derived and added to fill the empty positions in the merging candidate list if the number of available candidates is smaller than the fixed candidate list size.

Figure 4:
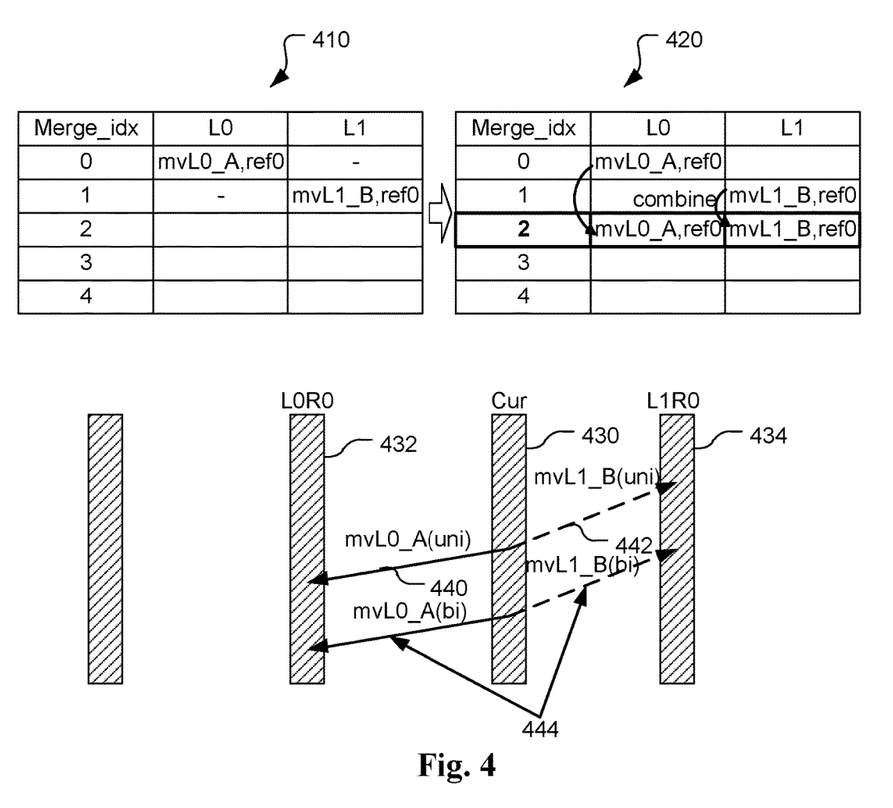
FIG. 4 illustrates an example of generating a bi-predictive motion candidate by combining two original motion candidates and the generated bi-predictive motion candidate is inserted into the candidate list.

Two types of additional candidates are used to fill the merging candidate list: the combined bi-predictive motion candidate and the zero vector motion candidate. The combined bi-predictive motion candidates are created by combining two original motion candidates according to a pre-defined order. FIG. 4 illustrates an example of generating a bi-predictive motion candidate 444 by combining two original motion candidates 440 and 442. Candidate list 410 corresponds to an original list containing two candidates: mvL0_A with ref0 and mvL1_B with ref0. Motion vector mvL0_A points from the current block in the current picture 430 to a reference block in a reference picture L0R0 432 in list 0. Motion vector mvL1_B points from the current block in the current picture 430 to a reference block in a reference picture L1R0 434 in list 1. The update candidate list 420 includes this combined bi-predictive motion candidate. After adding the combined bi-predictive motion candidates, zero vector motion candidates can be added to the remaining positions if the merging candidate list still has empty position(s).

For a bi-predictive motion vector, each motion vector points to a reference block. The prediction is formed by averaging the two reference blocks pointed by the two motion vectors.

SUMMARY

A method and apparatus for video coding utilizing a motion vector predictor (MVP) for a motion vector (MV) for a block coded in Inter, Merge, or Skip mode are disclosed. According to an embodiment of the present invention, a current candidate list for the current block is derived based on MVs (motion vectors) associated with neighbouring blocks of the current block according to a pre-defined order. For uni-prediction, each candidate in the current candidate list includes one MV (motion vector) associated with list 0 or list 1. For bi-prediction, each candidate includes two MVs (motion vectors) associated with both list 0 and list 1. A mean candidate is derived from at least two candidates in the current candidate list. The mean candidate includes two MVs for the bi-prediction or one MV for the uni-prediction, and at least one MV of the mean candidate is derived as a mean of the MVs of said at least two candidates in one of list 0 and list 1. The mean candidate is added to the current candidate list to form a modified candidate list, and one selected candidate is determined as a MVP (motion vector predictor) or MVPs (motion vector predictors) from the modified candidate list, for a current MV or current MVs of the current block. The current block is then encoded or decoded in Inter, Merge, or Skip mode utilizing the MVP or MVPs selected.

In one embodiment, two candidates, designated as a first candidate and a second candidate, are used to derive the mean candidate. In one example, at least one MV of the mean candidate are derived from the first candidate and the second candidate. For example, when both of the two MVs of the mean candidate are derived from the first and the second candidates, one of the two MVs of the mean candidate is derived as a first mean MV of the first candidate and the second candidate in list 0 and the other of the two MVs of the mean candidate is derived as a second mean MV of the first candidate and the second candidate in list 1. In another embodiment, both the first candidate and the second candidate have existing MV in a first list and the MV of the mean candidate in the first list is derived as a mean MV of the first candidate and the second candidate in the first list. However, only the first candidate has existing MV in a second list and the MV of the mean candidate in the second list is set to the MV of the first candidate; and wherein the first list and the second list correspond to list 0 and list 1 respectively, or list 1 and list 0 respectively. In yet another example, the mean of the MVs of the first candidate and the second candidate is calculated for only one of horizontal and vertical components of the mean candidate. In this case, the other of horizontal and vertical components of the mean candidate is set to the other of horizontal and vertical components of either the first candidate or the second candidate.

The at least two candidates may correspond to all spatial candidates, all temporal candidates, or all spatial candidates and all temporal candidates. The mean of the MVs of the at least two candidates in one of list 0 and list 1 is calculated using "rounding half up", "rounding half down", "rounding toward zero", "rounding away from zero" to fit in limited bit-depth representation.

The current block may correspond to a coding unit (CU). The size of the current candidate list or the modified candidate list is dependent on the size of the current block. For example, a larger candidate list size is used for a larger coding unit and a smaller candidate list size is used for a smaller coding unit.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

Figure 5:
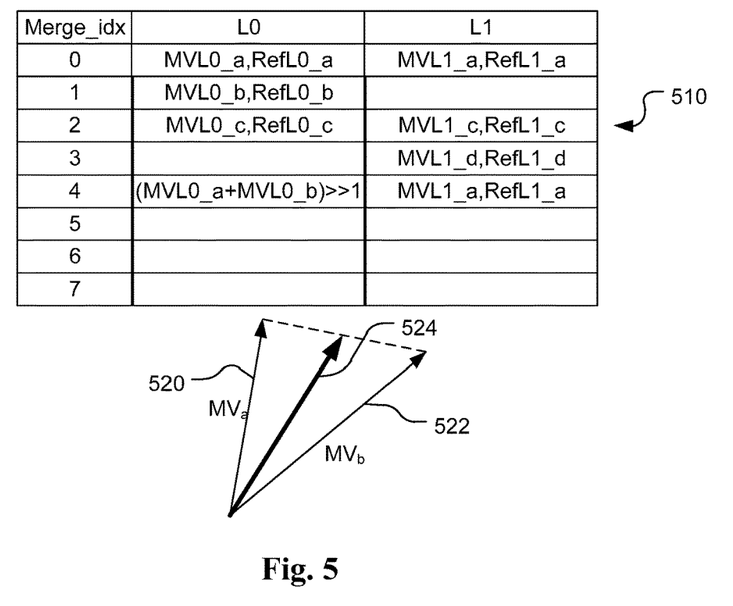
FIG. 5 illustrates an example of mean MVP or mean Merge candidate generated by averaging the motion information of two available MVPs or candidates according to a predefined order as illustrated.

To improve the coding efficiency, new methods of generating the motion vector predictor (MVP) or Merge candidate for Skip, Merge, Direct and/or Inter modes are disclosed in this invention. In particular, an average MVP (also called mean MVP) or average Merge candidate (also called mean Merge candidate) is proposed in the present invention. According to the proposed mean MVP or mean Merge candidate, the candidate is generated as the mean value of the motion information of two or more available MVPs or candidates according to a predefined order as illustrated in FIG. 5. In FIG. 5, the candidates with Merge_idx {0-3} are the original candidates in the candidate list 510 and the candidate with Merge_idx=4 is one example of the proposed mean candidate. In this example, the mean candidate is generated by averaging the MVs of candidate 0 (i.e., Merge idx=0) and candidate 1 (i.e., Merge idx=1). For list 0, the list 0 MV of the mean candidate 524 is derived as the average of MVL0_a 520 and MVL0_b 522. If RefL0_b and RefL0_b point to a same reference picture, the picture reference index of the average candidate in List 0 can be set to RefL0_a=RefL0_b.

However, if RefL0_a and RefL0_b point to two difference reference pictures, the picture reference index of the average candidate can be set to RefL0_a, and the MV can be derived as the average of MVL0_a and scaled MVL0_b, where the scaled MVL0_b is generated by scaling MVL0_to point to the reference picture RefL0_a. The MV scaling technique is well known in the art. For example, the scaling can be based on the POC (picture order count) distance. In another example, the picture reference index of the average candidate can also be set to RefL0_b and the MV can be derived as the average of MVL0_b and scaled MVL0_a that is generated by scaling MVL0_a to point to the reference picture RefL0_b.

In the example shown in FIG. 5, since there is no MV of list 1 in candidate 1, the list 1 MV of the average candidate is set to the list 1 MV of candidate 0 (i.e., MVL1_a).

Figure 6:
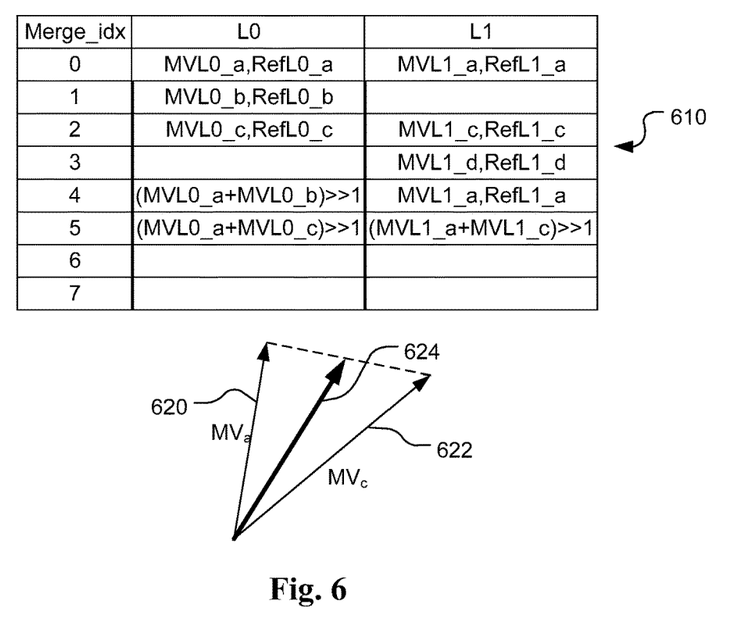
FIG. 6 illustrates another example of mean MVP or mean Merge candidate generated by averaging the motion information of two available MVPs or candidates according to a predefined order as illustrated.

In another example of the proposed average candidate as shown in FIG. 6, the list 0 MV and the list 1 MV of the average candidate are both derived as the average MV of two MVs. In this example, the candidate with Merge_idx=5 is the proposed average candidate. In this example, the average candidate is generated by averaging the MVs of candidate 0 (i.e., Merge idx=0) and candidate 2 (i.e., Merge_idx=2) in the candidate list 610.

For list 0, the list 0 MV of the average candidate 624 is derived as the average of MVL0_a 620 and MVL0_c 622. If RefL0_a and RefL0_c point to a same reference picture, the picture reference index of the average candidate in List 0 can be set to RefL0_a=RefL0_c. However, if RefL0_a and RefL0_c point to two difference reference pictures, the picture reference index of the average candidate can be set to RefL0_a and the MV can be derived as the average of MVL0_a and scaled MVL0_c, where MVL0_c is scaled to point to the reference picture RefL0_a. In another example, the picture reference index of the average candidate can also be set to RefL0_c and the MV can be derived as the average of MVL0_c and scaled MVL0_a, where MVL0_a is scaled to point to the reference picture RefL0_c. As for list 1, the list 1 MV of the average candidate is derived as the average of MVL1_a and MVL1_c based on the same rule described above.

In another embodiment, the average candidate is derived as the average of two MVs pointing to a same reference picture. For example, it searches every pair of candidates in the candidate list based on a predefined order. For each pair, if the two candidates have MVs point to a same reference picture in at least one List, the average candidate will be derived. Otherwise, the average candidate will not be derived from that pair. The process to derive the average candidates continues until all the possible pairs have been searched or the candidate list is fully filled.

In another embodiment, the process to derive the average candidate searches every pair of candidates in the candidate list with a given target reference picture index. For example, for each pair if the two candidates have MVs point to the given target reference picture index (e.g. the first reference picture, i.e., reference index=0) in at least one list, the average candidate will be derived. Otherwise, the average candidate will not be derived from that pair. The process to derive the average candidates continues until all the possible pairs have been searched or the candidate list is fully filled in.

In the above embodiment, after searching all the possible pairs of MVs, if candidate list is not fully filled, the process may continue to search each pair of two candidates that have MVs point to the second reference picture, and the third reference picture and so on.

The motion vector has two components: the horizontal component and vertical component. In another embodiment, in order to simplify the process of calculating the average of two candidate MVs (i.e., MV_a and MV_b), only the motion vector in one direction is averaged. For example, only the horizontal components of MV_a and MV_b are averaged as the horizontal MV of the average MV. As for the other dimension (i.e., vertical dimension for this example), the motion vector in the vertical dimension for the average MV is directly set to the motion vector in the vertical dimension of MV_a or MV_b.

The proposed average candidate can be added into any position in the candidate list instead of the last position shown in FIG. 5 and FIG. 6. In one example, the average candidate is added before the zero candidates but after the spatial candidate and temporal candidate.

In another embodiment, a mean candidate is derived as the mean motion vector of the motion vectors from a group of candidates. The group of candidates can be the group of all spatial candidates, the group of all temporal candidates, or the group of all spatial and temporal candidates.

In one embodiment, the mean candidate is derived as the mean motion vector of the motion vectors pointing to a given target reference picture index from a group of candidates. For example, the List X (X=0 or 1) MV of the mean candidate is derived as the mean motion vector of the List X MVs from the groups of candidates that pointing to the given reference picture index, such as reference index 0.

The given target reference picture index could be predefined, or explicitly transmitted into the bitstream, or implicitly derived from the MVs of the groups of candidates. For example, the target reference picture index is derived as the majority/minimum/maximum of the reference indexes from the groups of candidates.

In another embodiment, the mean candidate is derived as the mean vector of the scaled MVs from a group of candidates. For example, all the MVs are scaled to a target reference picture before averaging. The given target reference picture index can be predefined, or explicitly transmitted in the bitstream, or implicitly derived from the MVs of the groups of candidates. For example, the target reference picture index is derived as the majority/minimum/maximum of the reference indexes from the groups of candidates.

In one embodiment, only the mean motion vector in one list (List 0 or List 1) is calculated. The motion vector of the other list (List 1 or List 0) for the mean candidate is directly set to the MV in the other list of one candidate in the group of candidates.

In one embodiment, the proposed mean candidate is for uni-prediction (i.e., the mean candidate includes one MV). In this case, the MV of the mean candidate is derived from either List 0 MVs or List 1 MVs of candidates in the candidate list.

Figure 7:
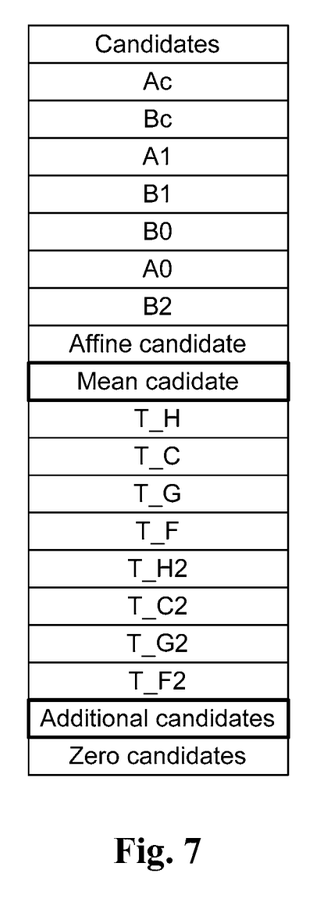
FIG. 7 illustrates an example of candidate list generated according to an embodiment of the present invention, where the mean candidate is inserted into the list.

The proposed mean candidate can be added into any position in the candidate list. In one example, the proposed mean candidate is derived as the mean motion vector from a group of all available spatial candidates (Ac, Bc, A1, B1, B0, A0, and B2) and is added after the spatial candidates and the affine candidate as illustrated in FIG. 7.

The averaging process of the aforementioned methods can be done with different rounding mechanism such as "rounding half up", "rounding half down", "rounding toward zero", "rounding away from zero" and any other means to replace the average value with another representation to fit in the limited bit-depth representation.

The generated average candidates can also be compared to the original candidates to check the redundancy. If the average candidate is identical to the original candidate, it will not be included in the candidate list.

In another embodiment, the size of Merge candidate list is adaptively selected according to the CU size, where a larger Merge candidate list is used for a larger CU. For example, the sizes of Merge candidate list for various CU size can be selected as follows:

128×128 CU: size=9
64×64 CU: size=8
32×32 CU: size=7
16×16 CU: size=6
8×8 CU: size=5

Figure 8:
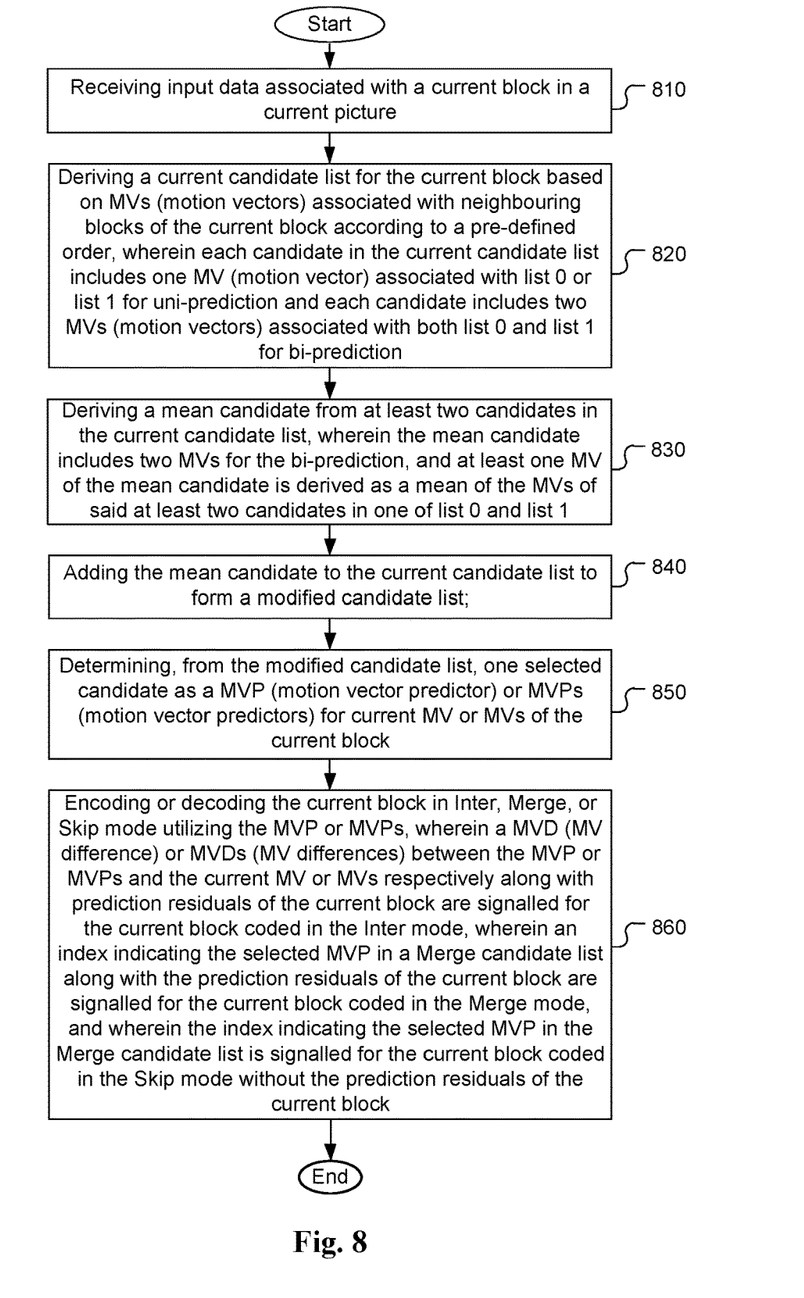
FIG. 8 illustrates an exemplary flowchart of a video coding system using a candidate list for Inter, Merge or Skip mode according to an embodiment of the present invention, where a mean candidate is derived from two or more candidates in the candidate list.

FIG. 8 illustrates an exemplary flowchart of a video coding system using a candidate list for Inter, Merge or Skip mode according to an embodiment of the present invention, where a mean candidate is derived from two or more candidates in the candidate list. The system receives input data associated with a current block in a current picture in step 810. In the encoder side, the input data corresponds to pixel data to be encoded. In the decoder side, the input data corresponds to coded data or prediction residuals to be decoded. A current candidate list for the current block is derived based on MVs (motion vectors) associated with neighbouring blocks of the current block according to a pre-defined order as shown in step 820. Each candidate in the current candidate list includes one MV (motion vector) associated with list 0 or list 1 for uni-prediction and each candidate includes two MVs (motion vectors) associated with both list 0 and list 1 for bi-prediction. Any known procedure to generate the candidate lists can be used. For example, the Inter, Merge and Skip candidate lists according to the HEVC standard may be used. A mean candidate is derived from at least two candidates in the current candidate list in step 830. The mean candidate includes two MVs for the bi-prediction or one MV for the uni-prediction, and at least one MV of the mean candidate is derived as a mean of the MVs of said at least two candidates in one of list 0 and list 1. The mean candidate is added to the current candidate list to form a modified candidate list in step 840. For example, the mean candidate can be added to the last position or a pre-defined position in the candidate list. One selected candidate is determined from the modified candidate list and is used as a MVP (motion vector predictor) or MVPs (motion vector predictors) for a current MV or current MVs of the current block in step 850. The current block is encoded or decoded in Inter, Merge, or Skip mode utilizing the MVP or MVPs in step 860. When the current block is coded in the Inter mode, a MVD (MV difference) or MVDs (MV differences) between the MVP or MVPs and the current MV or current MVs respectively along with prediction residuals of the current block are signalled for the current block. When the current block is coded in the Merge mode, an index indicating the selected MVP in a Merge candidate list along with the prediction residuals of the current block are signalled for the current block. When the current block is coded in the Skip mode, the index indicating the selected MVP in the Merge candidate list is signalled for the current block.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics.

The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding utilizing a motion vector predictor (MVP) for a motion vector (MV) for a block coded in Inter, Merge, or Skip mode, wherein the MV is associated with one given block and one corresponding reference block in a given reference picture in a given reference list, the method comprising:

receiving input data associated with a current block in a current picture;

deriving a current candidate list for the current block based on MVs (motion vectors) associated with neighbouring blocks of the current block according to a pre-defined order, wherein each candidate in the current candidate list includes one MV (motion vector) associated with list 0 or list 1 for uni-prediction and each candidate includes two MVs (motion vectors) associated with both list 0 and list 1 for bi-prediction;

deriving a mean candidate from at least two candidates in the current candidate list, wherein the mean candidate includes two MVs for the bi-prediction or one MV for the uni-prediction, and at least one MV of the mean candidate is derived as a mean of the MVs of said at least two candidates in one of list 0 and list 1;

adding the mean candidate to the current candidate list to form a modified candidate list;

determining, from the modified candidate list, one selected candidate as a MVP (motion vector predictor) or MVPs (motion vector predictors) for a current MV or current MVs of the current block; and encoding or decoding the current block in Inter, Merge, or Skip mode utilizing the MVP or MVPs, wherein a MVD (MV difference) or MVDs (MV differences) between the MVP or MVPs and the current MV or current MVs respectively along with prediction residuals of the current block are signalled for the current block coded in the Inter mode, wherein an index indicating the selected MVP in a Merge candidate list along with the prediction residuals of the current block are signalled for the current block coded in the Merge mode, and wherein the index indicating the selected MVP in the Merge candidate list is signalled for the current block coded in the Skip mode without the prediction residuals of the current block.

2. The method of claim 1, wherein said at least two candidates correspond to two candidates designated as a first candidate and a second candidate.

3. The method of claim 2, wherein both of the two MVs of the mean candidate are derived from the first candidate and the second candidate, wherein one of the two MVs of the mean candidate is derived as a first mean MV of the first candidate and the second candidate in list 0 and the other of the two MVs of the mean candidate is derived as a second mean MV of the first candidate and the second candidate in list 1.

4. The method of claim 2, wherein both the first candidate and the second candidate have existing MV in a first list and the MV of the mean candidate in the first list is derived as a mean MV of the first candidate and the second candidate in the first list; and only the first candidate has existing MV in a second list and the MV of the mean candidate in the second list is set to the MV of the first candidate; and wherein the first list and the second list correspond to list 0 and list 1 respectively, or list 1 and list 0 respectively.

5. The method of claim 2, wherein the mean of the MVs of the first candidate and the second candidate is calculated for only one of horizontal and vertical components of the mean candidate.

6. The method of claim 5, wherein the other of horizontal and vertical components of the mean candidate is set to the other of horizontal and vertical components of either the first candidate or the second candidate.

7. The method of claim 1, wherein said at least two candidates correspond to all spatial candidates, all temporal candidates, or all spatial candidates and all temporal candidates.

8. The method of claim 1, wherein the mean of the MVs of said at least two candidates in one of list 0 and list 1 is calculated using "rounding half up", "rounding half down", "rounding toward zero", "rounding away from zero" to fit in limited bit-depth representation.

9. The method of claim 1, wherein mean candidates are derived for all candidate pairs pointing to a same reference picture in at least one list unless the current candidate list or the modified candidate list is full.

10. The method of claim 1, wherein the mean candidate is inserted into the current candidate list in a pre-defined location.

11. The method of claim 1, wherein the mean candidate is derived from a group of candidates pointing to a target reference picture.

12. The method of claim 1, wherein the current block corresponds to a coding unit (CU).

13. The method of claim 1, wherein size of the current candidate list or the modified candidate list for Merge mode is dependent on size of the current block.

14. An apparatus of video coding utilizing a motion vector predictor (MVP) for a motion vector (MV) for a block coded in Inter, Merge, or Skip mode, wherein the MV is associated with one given block and one corresponding reference block in a given reference picture in a given reference list, the apparatus comprising one or more electronic circuits or processors configured to:

receive input data associated with a current block in a current picture;

derive a current candidate list for the current block based on MVs (motion vectors) associated with neighbouring blocks of the current block according to a pre-defined order, wherein each candidate in the current candidate list includes one MV (motion vector) associated with list 0 or list 1 for uni-prediction and each candidate includes two MVs (motion vectors) associated with both list 0 and list 1 for bi-prediction;

derive a mean candidate from at least two candidates in the current candidate list, wherein the mean candidate includes two MVs for the bi-prediction or one MV for the uni-prediction, and at least one MV of the mean candidate is derived as a mean of the MVs of said at least two candidates in one of list 0 and list 1;

add the mean candidate to the current candidate list to form a modified candidate list;

determine, from the modified candidate list, one selected candidate as a MVP (motion vector predictor) or MVPs (motion vector predictors) for a current MV or current MVs of the current block; and encode or decode the current block in Inter, Merge, or Skip mode utilizing the MVP or MVPs, wherein a MVD (MV difference) or MVDs (MV differences) between the MVP or MVPs and the current MV or current MVs respectively along with prediction residuals of the current block are signalled for the current block coded in the Inter mode, wherein an index indicating the selected MVP in a Merge candidate list along with the prediction residuals of the current block are signalled for the current block coded in the Merge mode, and wherein the index indicating the selected MVP in the Merge candidate list is signalled for the current block coded in the Skip mode without the prediction residuals of the current block.

15. The apparatus of claim 14, wherein said at least two candidates correspond to two candidates designated as a first candidate and a second candidate.

16. The apparatus of claim 15, wherein both of the two MVs of the mean candidate are derived from the first candidate and the second candidate, wherein one of the two MVs of the mean candidate is derived as a first mean MV of the first candidate and the second candidate in list 0 and the other of the two MVs of the mean candidate is derived as a second mean MV of the first candidate and the second candidate in list 1.

17. The apparatus of claim 15, wherein both the first candidate and the second candidate have existing MV in a first list and the MV of the mean candidate in the first list is derived as a mean MV of the first candidate and the second candidate in the first list; and only the first candidate has existing MV in a second list and the MV of the mean candidate in the second list is set to the MV of the first candidate; and wherein the first list and the second list correspond to list 0 and list 1 respectively, or list 1 and list 0 respectively.

18. The apparatus of claim 15, wherein the mean of the MVs of the first candidate and the second candidate is calculated for only one of horizontal and vertical components of the mean candidate.

19. The apparatus of claim 14, wherein said at least two candidates correspond to all spatial candidates, all temporal candidates, or all spatial candidates and all temporal candidates.

20. The apparatus of claim 14, wherein the mean of the MVs of said at least two candidates in one of list 0 and list 1 is calculated using "rounding half up", "rounding half down", "rounding toward zero", "rounding away from zero" to fit in limited bit-depth representation.

* * * * *